No. 806,916. PATENTED DEC. 12, 1905.
C. A. RICH.
CLUTCH CONTROLLING MECHANISM.
APPLICATION FILED FEB. 5, 1904.

2 SHEETS—SHEET 1.

WITNESSES,
James H. Thurston
Catherine G. Bradley

INVENTOR,
Charles A. Rich,
BY Wilmarth H. Thurston
ATT'Y.

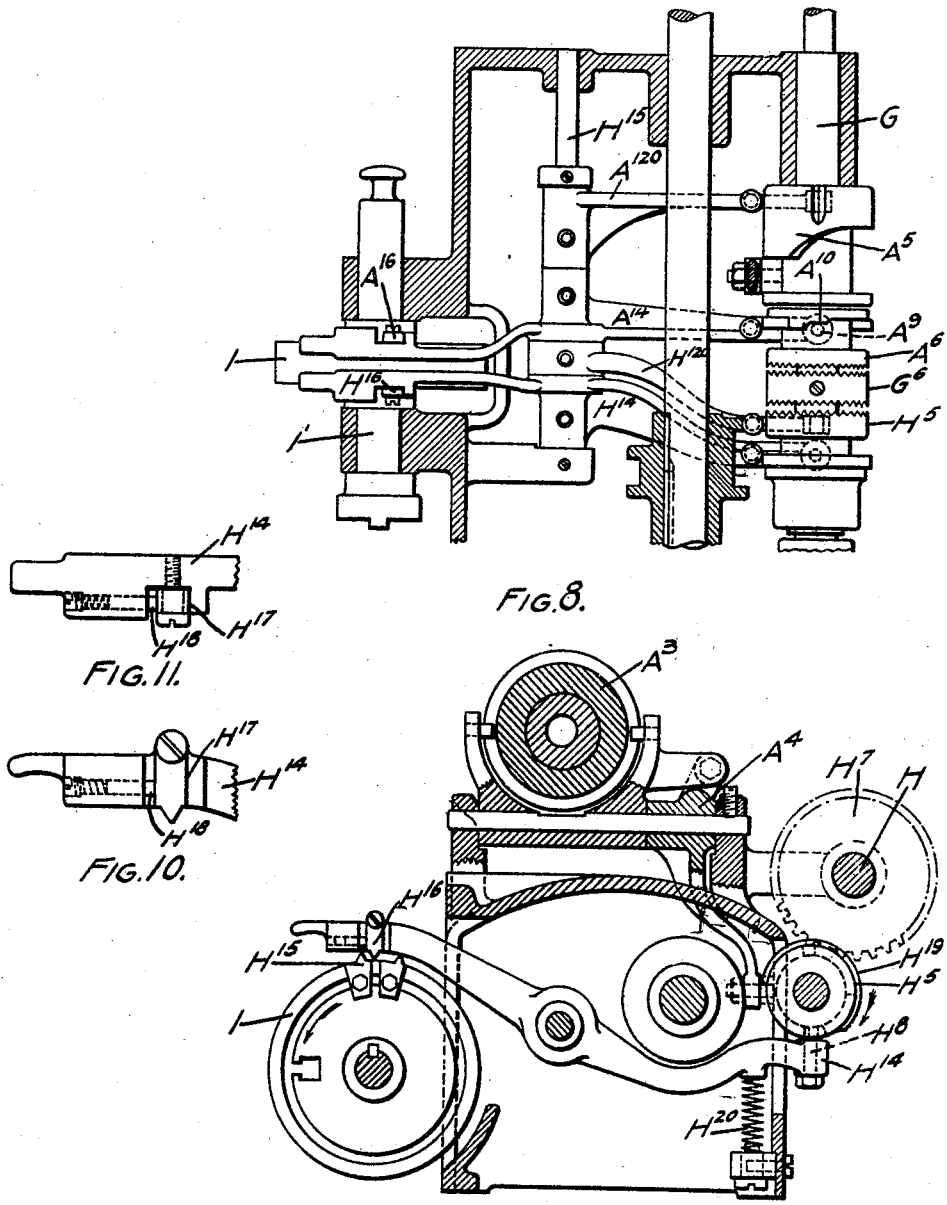

UNITED STATES PATENT OFFICE.

CHARLES A. RICH, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

CLUTCH-CONTROLLING MECHANISM.

No. 806,916.     Specification of Letters Patent.     Patented Dec. 12, 1905.

Application filed February 5, 1904. Serial No. 192,153.

*To all whom it may concern:*

Be it known that I, CHARLES A. RICH, of the city and county of Providence, State of Rhode Island, have invented certain new and useful Improvements in Clutch-Controlling Mechanism; and I do hereby declare the following specification, taken in connection with the accompanying drawings, forming a part of the same, to be a full, clear, and exact description thereof.

The invention relates to devices for controlling and timing the operation of the clutch or other device which is to be thrown into and out of operation at intervals.

The features of invention may be embodied and used with advantage in various mechanisms and machines in which it is desirable to control a rapidly-operating clutch or part from a slow-moving device.

The various features of the invention will be more fully explained in connection with the detailed description of the mechanisms in which I have embodied them and will be set forth in the claims. These mechanisms are illustrated in the accompanying drawings, in which—

Figure 1:
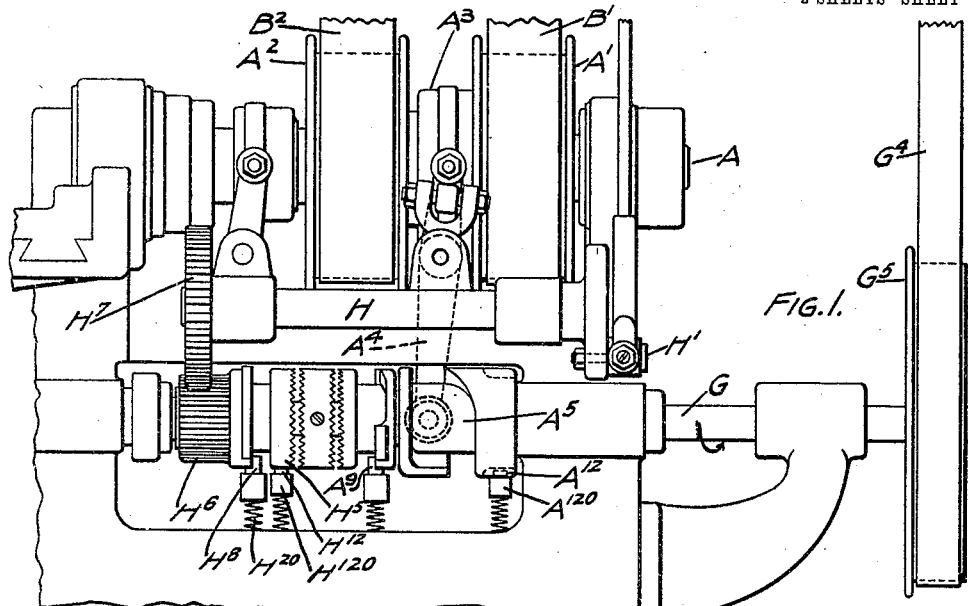
Figure 2:
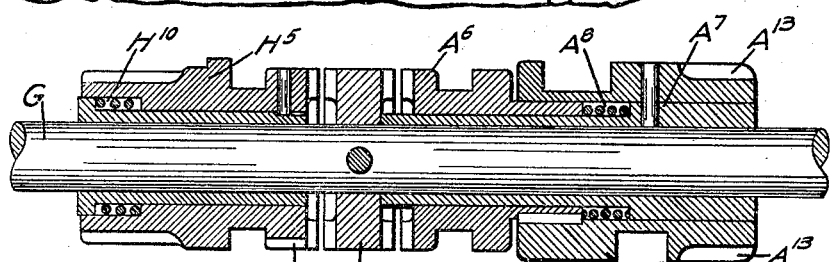
Figures 3, 4:
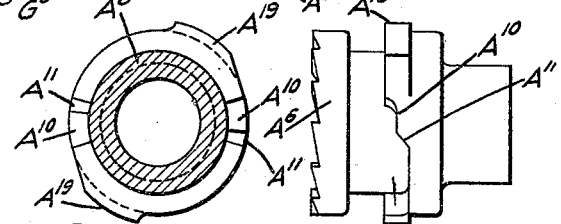
Figure 7:
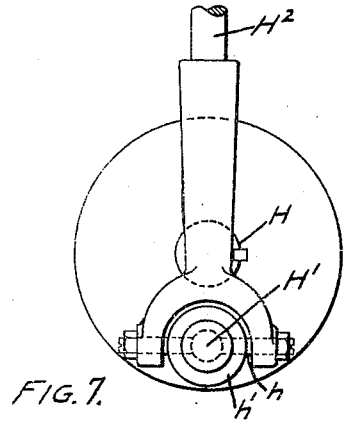
Figures 5, 6:
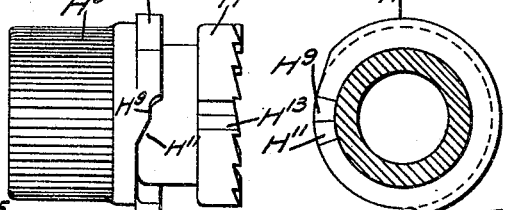

Figure 1 is a rear elevation showing the spindle end of so much of a screw-machine as is necessary to show the application of the present improvements thereto. Fig. 2 is a sectional detail of the clutches and cams carried by the back shaft. Figs. 3 to 6 are details of the clutches and cams carried by the back shaft. Fig. 7 is a detail showing a part of the devices for changing the speed of the spindle. Fig. 8 is a horizontal sectional view taken through the axis of the back shaft in Fig. 1. Fig. 9 is a vertical transverse sectional view, parts being broken away. Figs. 10 and 11 are details of the tripping devices for controlling the clutches carried by the back shaft.

In the drawings the features of the invention are shown embodied in a screw-machine having the same general construction as the screw-machine shown in the patent to W. S. Davenport, numbered 604,306 and dated May 17, 1898. In this machine the stock being operated upon is carried by a spindle A, upon which is mounted two pulleys $A'$ $A^2$, either of which may be connected with the spindle by means of a clutch $A^3$, mounted between the pulleys and connected with a clutch-shifting lever $A^4$. The pulleys $A'$ $A^2$ are driven in opposite directions by crossed and open belts $B'$ $B^2$, which pass over said pulleys and over a pulley or pulleys secured to an overhead counter-shaft. The machine is provided with shaft H, mounted upon the rear of the headstock and connected, by means of a crank $H'$ and rod $H^2$, with mechanism (not shown) for changing the speed of the counter-shaft which carries the pulleys for the belts $B'$ $B^2$. The rod $H^2$ is connected with the crank $H'$ by pins $h'$, engaging a collar $h$ loose on the crank, so that the rod may accommodate itself to the movements of the crank and the connected mechanism. The changes in speed are effected by giving the shaft H a half-revolution at proper intervals, the spindle being driven at one or the other of two speeds, according to the position of the shaft and crank. The shaft H is given a half-revolution at the desired intervals by means of a clutch $H^5$, which carries a pinion $H^6$, meshing with a gear $H^7$, secured to the shaft H, the pinion being one-half the diameter of the gear, so that a complete revolution of the clutch $H^5$ turns the shaft H through a half-revolution. The clutch $H^5$ is arranged to engage and be driven by a constantly-rotating clutch member $G^6$, secured to the back shaft G. The clutch $H^5$ is normally held out of engagement with the clutch member $G^6$ by an abutment $H^8$, which engages a cam-shoulder $H^9$ on the clutch and holds said clutch against the pressure of a spring $H^{10}$, which tends to force it into engagement with the clutch member $G^6$. When the abutment $H^8$ is disengaged from the cam-shoulder $H^9$, the spring $H^{10}$ forces the clutch into engagement with the clutch member $G^6$, so that the clutch is operated by said clutch member. As the clutch completes a single revolution the incline $H^{11}$ of the cam-shoulder $H^9$ engages the abutment $H^8$, which has meanwhile returned into position to be engaged by said cam, and forces the clutch out of engagement with the clutch member $G^6$, thus stopping the rotation of the clutch after it has made a complete revolution. The clutch is held in normal position by a V-shaped pin $H^{12}$, carried on a spring-pressed lever $H^{120}$ and arranged to engage a similar-shaped notch $H^{13}$ in the clutch.

The abutment $H^8$ is in the form of a pin mounted in the rear end of a lever $H^{14}$, pivoted on a rod $H^{15}$, Fig. 8. The lever $H^{14}$ is rocked at the desired intervals to throw the clutch $H^5$ into operation by means of tripping-dogs $H^{15}$, arranged to engage a trip-finger $H^{16}$, mounted on the front end of the lever $H^{14}$. The tripping-dogs $H^{15}$ are adjustably mounted on a disk I, secured to the front shaft I′, corresponding to the front shaft in the machine of the patent referred to. As many dogs $H^{15}$ may be mounted on the disk I as desired, and these dogs may be adjusted to trip the lever $H^{14}$ and throw the clutch $H^5$ into operation at the desired intervals during the operation of the machine.

In the machine referred to the front shaft I′ makes a single revolution for each cycle of operations performed by the machine during the production of a single piece of work, and this shaft, therefore, is rotated at a comparatively slow rate of speed. The back shaft G, on the other hand, is driven at a high rate of speed, and consequently the time consumed in rotating the clutch $H^5$ through a single revolution is very small. In order, however, for the clutch to be thrown out of engagement with the clutch member $G^6$ at the end of a single revolution, the pin $H^8$ must be free to return into the path of the cam $H^{11}$ before the clutch has completed its revolution. The pin $H^8$ cannot return, however, until the dog $H^{15}$, which operated against the trip $H^{16}$, has passed from under the trip, so that the lever $H^{14}$ can return to its normal position. In some instances—as, for example, in making articles which involve a comparatively long period of time for their production—it may be desirable to rotate the shaft I at so slow a speed that the travel of the dogs cannot alone be relied upon to free the dog and trip in proper time to throw out the clutch $H^5$ at the end of a single revolution. To avoid this difficulty and to enable the abutment $H^8$ to quickly return to its normal position after being tripped, I have provided means for freeing the dog and trip independently of the travel of the dog after it has tripped the abutment. In practicing this feature of my invention I so mount the trip $H^{16}$ upon the lever $H^{14}$ that it is moved out of normal position against the tension of a spring by the engagement of a dog therewith and is quickly returned into normal position on the lever as soon as it disengages the dog, thus bringing it into position behind the dog, where it will not interfere with the return of the lever $H^{14}$ to its normal position. In order to increase the rapidity with which the trip is freed from the dog, I provide a cam on the clutch, which engages the rear end of the trip-lever as soon as the clutch starts to rotate and lifts the trip away from the dog, so that it may immediately move into a position behind the dog where it will not interfere with the return of the trip-lever to normal position. By this construction the proper operation and timing of the clutch $H^5$ is insured without regard to the speed at which the tripping-dogs are traveling. As shown, the dog $H^{15}$ is pivoted upon the lever $H^{14}$ and is held normally against a shoulder $H^{17}$ by a spring-pressed plunger $H^{18}$. When the dog $H^{15}$ strikes the trip-finger $H^{16}$, the finger $H^{16}$ is first swung away from the shoulder $H^{17}$ against the action of the plunger $H^{18}$, and then continued movement of the dog forces the trip and front end of the lever $H^{14}$ upward, thus moving the pin $H^8$ out of engagement with the cam-shoulder $H^9$. As soon as the clutch $H^{15}$ starts its rotation a cam $H^{19}$, carried by the clutch, engages the rear end of the lever $H^{14}$, forcing this end of the lever downward, and thus raising the trip-finger $H^{16}$ out of engagement with the dog $H^{15}$. The finger $H^{16}$ then immediately returns to position against the shoulder $H^{14}$, which movement brings it back of the dog $H^{15}$, so that the lever $H^{14}$ is free to return to normal position under the influence of its operating-spring $H^{20}$.

I have also employed the feature of invention just described in controlling the clutch, the rotation of which operates the clutch-shifting lever $A^4$, already referred to. This lever $A^4$ is operated by a cam $A^5$, which is given a half-revolution to shift the clutch $A^3$ from one spindle-driving pulley to the other. The cam $A^5$ is connected with a clutch $A^6$, arranged to engage and be driven by clutch-teeth on the clutch member $G^6$, Figs. 1 and 2. The clutch $A^6$ is keyed to slide on a sleeve $A^7$, to which the cam $A^5$ is pinned, and is forced toward the clutch member $G^6$ by a spring $A^8$. The clutch is held out of engagement with the clutch member $G^6$ against the tension of the spring $A^8$ by an abutment $A^9$, arranged to engage one or the other of two cam-shoulders $A^{10}$, formed on the clutch. There are two of these cam-shoulders $A^{10}$ on the clutch, and they are arranged diametrically opposite each other, so that the clutch is disengaged after the completion of a half-revolution instead of after the completion of a complete revolution, as in the case of the clutch $H^5$. The clutch is thrown out of engagement with the clutch member $G^6$ by the action of the inclined portions $A^{11}$ of the cam-surfaces $A^{10}$ in the manner described with relation to the operation of the clutch $H^5$. The clutch and cam are held in their normal position by a V-shaped pin $A^{12}$, carried by a spring-pressed lever $A^{120}$ and arranged to engage similar-shaped notches $A^{13}$, formed in the cam $A^5$. The abutment $A^9$ is in the form of a pin carried or the rear end of a lever $A^{14}$, pivoted on the bar $H^{15}$ and provided at its front end with a spring trip-finger $A^{16}$, similar in construction and operation to the trip-finger $H^{16}$, already described. This trip-finger $A^{16}$ is operated upon by dogs similar to dogs $H^{15}$, which are adjustably mounted on the side of the disk 1 opposite to the dogs $H^{15}$.

The clutch $A^6$ is provided with two cams $A^{19}$ for engaging the rear end of the lever $A^{14}$ when the clutch starts to revolve, and thus disengage the trip $A^{16}$ from its operating-dog. This feature of freeing the dog and trip independently of the travel of the dog is of especial importance in connection with the clutch $A^6$, which is to be thrown out of operation at each half-revolution and enables this clutch to be accurately timed and controlled by means of a single abutment and a single set of tripping devices.

What I claim, and desire to secure by Letters Patent, is—

1. The combination with a clutch, of a cam-shoulder thereon, an abutment engaging said shoulder, a trip for operating said abutment, a traveling dog for operating said trip, and means for freeing the dog and trip independently of the travel of the dog, substantially as described.

2. The combination of a traveling trip-dog, a trip operated by the dog, and means for freeing the dog and trip independently of the travel of the dog, substantially as described.

3. The combination of a traveling trip-dog, a trip having a limited movement with the dog, and means for restoring the trip to normal position when disengaged from the dog, substantially as described.

4. The combination with a clutch of a cam-shoulder thereon, an abutment engaging said shoulder, tripping devices comprising a traveling part and a coöperating part engaged thereby connected with the abutment, one of said parts being yieldingly mounted to have a limited idle movement as the traveling part engages the coöperating part, substantially as described.

5. The combination with a clutch, of an abutment, a cam on the clutch for engaging said abutment and disengaging said clutch, a trip connected with said abutment, a traveling trip-dog for operating said trip, and means operated by the clutch for freeing the trip and dog, substantially as described.

6. The combination with a clutch, provided with a cam, a trip-lever provided with an abutment normally engaging said cam, a spring-trip on the lever, a traveling trip-dog for engaging said trip, and a cam connected with the clutch for moving said lever to disengage the trip and dog, substantially as described.

7. The combination with a clutch, of a trip-lever for controlling the operation of the clutch, a spring-trip on the lever, and a traveling dog engaging said trip to trip the lever, substantially as described.

8. The combination with a clutch, of a trip-lever for controlling the operation of the clutch, a spring-trip on the lever, a traveling dog engaging said trip to trip the lever, and a cam operated by the rotation of the clutch for operating the trip-lever to disengage the trip and dog, substantially as described.

9. The combination with a clutch, a plurality of cams thereon, an abutment for engaging said cams and holding the clutch out of action, a traveling dog, a trip in the path of the dog connected with the abutment and having a limited movement with the dog, substantially as described.

10. The combination with a clutch, a plurality of cams thereon, an abutment for engaging said cams and holding the clutch out of action, a traveling dog, a trip in the path of the dog connected with the abutment and having a limited movement with the dog, and a cam operated by the rotation of the clutch for disengaging the trip and dog, substantially as described.

CHARLES A. RICH.

Witnesses:
W. H. THURSTON,
J. H. THURSTON.